(12) United States Patent
Cimaz

(10) Patent No.: US 11,303,199 B2
(45) Date of Patent: Apr. 12, 2022

(54) DC-DC CONVERTER WITH STEADY STATE CURRENT LIMITATION

(71) Applicant: STMicroelectronics (Grand Ouest) SAS, Le Mans (FR)

(72) Inventor: Lionel Cimaz, Pleumeleuc (FR)

(73) Assignee: STMICROELECTRONICS (GRAND OUEST) SAS, Le Mans (FR)

( * ) Notice: Subject to any disclaimer, the term of this patent is extended or adjusted under 35 U.S.C. 154(b) by 0 days.

(21) Appl. No.: 16/854,483

(22) Filed: Apr. 21, 2020

(65) Prior Publication Data

US 2020/0366187 A1    Nov. 19, 2020

(30) Foreign Application Priority Data

May 17, 2019    (FR) .................................... 1905194

(51) Int. Cl.
  *H02M 1/32*    (2007.01)
  *H02M 3/02*    (2006.01)
  *H02M 1/00*    (2006.01)

(52) U.S. Cl.
  CPC .............. *H02M 1/32* (2013.01); *H02M 3/02* (2013.01); *H02M 1/0009* (2021.05); *H02M 1/0025* (2021.05)

(58) Field of Classification Search
  CPC .... H02M 1/0009; H02M 1/0025; H02M 1/32; H02M 3/02
  See application file for complete search history.

(56) References Cited

U.S. PATENT DOCUMENTS

| | | | |
|---|---|---|---|
| 2009/0322300 A1* | 12/2009 | Melanson | H02M 3/1563 323/284 |
| 2010/0253296 A1 | 10/2010 | Huang et al. | |
| 2011/0101949 A1* | 5/2011 | Lopata | H02M 3/156 323/286 |
| 2013/0069613 A1* | 3/2013 | Nakase | H02M 3/156 323/284 |
| 2013/0121047 A1* | 5/2013 | Lin | H02M 1/4225 363/84 |
| 2015/0222183 A1* | 8/2015 | Karlsson | H02M 3/156 323/271 |
| 2016/0308439 A1 | 10/2016 | Zarkhin et al. | |
| 2016/0329807 A1 | 11/2016 | Daly | |
| 2017/0207696 A1* | 7/2017 | Ishii | G10H 3/186 |
| 2020/0169159 A1* | 5/2020 | Bandyopadhyay | H02M 1/083 |

FOREIGN PATENT DOCUMENTS

| | | |
|---|---|---|
| EP | 2178198 A1 | 4/2010 |
| GB | 2395378 A | 5/2004 |

OTHER PUBLICATIONS

Linfinity Microelectronics, "Hiccup Mode Current Limiting", Linfinity Application Note, AN-8, Jul. 1998, XP055731083, 5 pages.

* cited by examiner

*Primary Examiner* — Kyle J Moody
*Assistant Examiner* — Lakaisha Jackson
(74) *Attorney, Agent, or Firm* — Slater Matsil, LLP

(57) ABSTRACT

A method for limiting an input or output current of a DC-DC converter and a current limiting circuit are disclosed. In an embodiment a method for limiting an input or output current of a DC to DC converter includes storing a first value representative of a level of an output voltage of the DC to DC converter in response to the input or output current exceeding or falling below a first threshold and modifying a control signal based on the first value.

22 Claims, 7 Drawing Sheets

DC-DC CONVERTER WITH STEADY STATE CURRENT LIMITATION

CROSS-REFERENCE TO RELATED APPLICATIONS

This application claims priority to French Patent Application No. 1905194, filed on May 17, 2019, which application is hereby incorporated herein by reference.

TECHNICAL FIELD

The present disclosure relates generally to the field of voltage converters, and in particular to steady state current limitation in a digital DC to DC converter.

BACKGROUND

In digitally controlled DC to DC converters it may be desirable to provide a variable current limitation, sometimes known in the art as CC (constant current) mode, in order to limit the input or output current, and thereby protect the converter and/or load from over-currents.

However, there is a difficulty in providing a simple, low cost solution for implementing a steady state current limitation mechanism.

SUMMARY

Embodiments provide a method of limiting an input or output current of a DC to DC converter comprising storing a first value representative of the level of an output voltage of the DC to DC converter in response to the input or output current exceeding or falling below a first threshold and modifying the control signal based on the first value.

According to one embodiment, the first value is equal to the value of the control signal when the input or output current exceeded or fell below the first threshold.

According to one embodiment, the first value is stored in response to the input or output current exceeding the first threshold, the method further comprising: in response to the input or output current falling below the first threshold or a further threshold, storing a second value representative of the level of the output voltage.

According to one embodiment, modifying the control signal based on the first and second values comprises modifying the control signal to bring the output voltage to an intermediate voltage level between the level of the output voltage represented by the first value and the level of the output voltage represented by the second value.

According to one embodiment, the intermediate voltage level is a midpoint between the level represented by the first value and the level represented by the second value.

According to one embodiment, the first value is equal to the value of the control signal when the input or output current exceeded the first threshold, the second value is equal to the value of the control signal when the input or output current fell below the first or further threshold, and the control signal is modified to a value between the first and second values.

According to one embodiment, the modified control signal is maintained for a fixed time delay.

According to one embodiment, the method further comprises, after maintaining the control signals for the fixed time delay, applying a control signal to the DC to DC converter to increase or decrease the output voltage until the output voltage again exceeds or falls below the first or further threshold.

According to one embodiment, the method further comprises, in response to the input or the output current again exceeding or falling below the first or further threshold, storing a third value representative of the level of the output voltage of the DC to DC converter and applying a control signal to the DC to DC converter to reduce the output voltage to a further intermediate voltage level between the level represented by the second value and the further level.

According to one embodiment, the method further comprises, in response to the input or output current yet again exceeding or falling below the first or further threshold, modifying the control signal based on the third value.

According to one embodiment, modifying the control signal based on the third value comprises modifying the control signal to bring the output voltage to a new intermediate voltage level between the level represented by the third value and the further intermediate level.

Various embodiments provide a current limiting circuit comprising a circuit configured to detect when an input or output current of a DC to DC converter exceeds, or falls below, a first threshold and a controller configured to store a first value representative of the level of an output voltage of the DC to DC converter in response to the input or output current of the DC to DC converter exceeding or falling below the first threshold and to modify the control signal based on the first value.

Further embodiments provide a DC to DC conversion circuit comprising a DC to DC converter and the above current limiting circuit.

Yet further embodiments provide an electronic device comprising a DC power source supplying a first voltage level and the above DC to DC conversion circuit configured to convert the first voltage level into the output voltage.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF ILLUSTRATIVE EMBODIMENTS

Like features have been designated by like references in the various figures. In particular, the structural and/or functional features that are common among the various embodiments may have the same references and may dispose identical structural, dimensional and material properties.

For the sake of clarity, only the operations and elements that are useful for an understanding of the embodiments described herein have been illustrated and described in detail. In particular, the particular circuit implementation of a buck, boost or buck-boost DC-DC converter has not been described, such circuits being well known to those skilled in the art.

Unless indicated otherwise, when reference is made to two elements connected together, this signifies a direct connection without any intermediate elements other than conductors, and when reference is made to two elements linked or coupled together, this signifies that these two elements can be connected or they can be linked or coupled via one or more other elements.

Unless specified otherwise, the expressions "around", "approximately", "substantially" and "in the order of" signify within 10%, and preferably within 5%.

Figure 1:
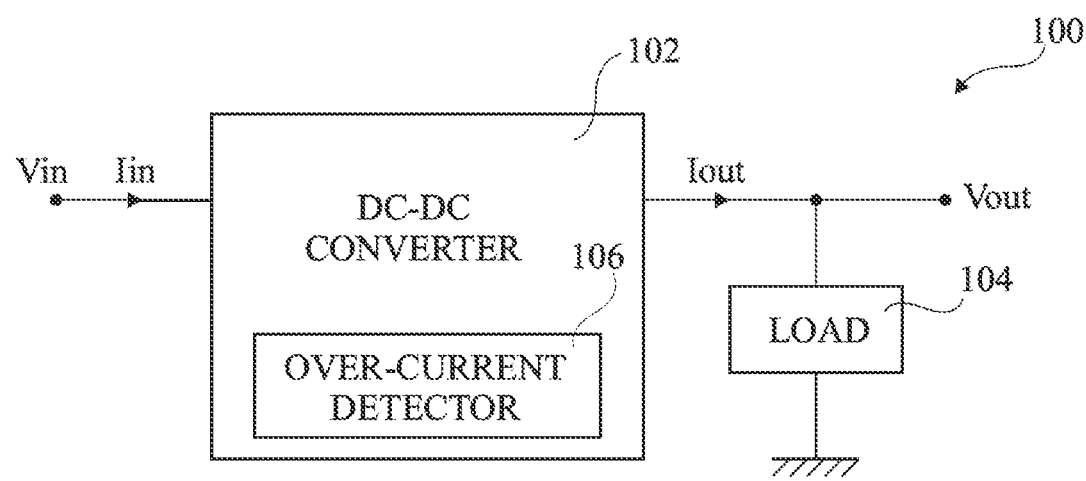
FIG. 1 schematically illustrates an example of a circuit comprising a DC-DC converter.

FIG. 1 schematically illustrates an example of a circuit 100 comprising a DC-DC voltage converter (DC-DC CONVERTER) 102. The DC-DC converter 102 receives an input voltage Vin and generates an output voltage Vout supplying a load (LOAD) 104 coupled to ground. The DC-DC converter 102 includes an over-current detector (OVER-CURRENT DETECTOR) 106 for detecting an over-current of the input current Iin and/or of the output current Iout of the converter 102.

Figure 2:
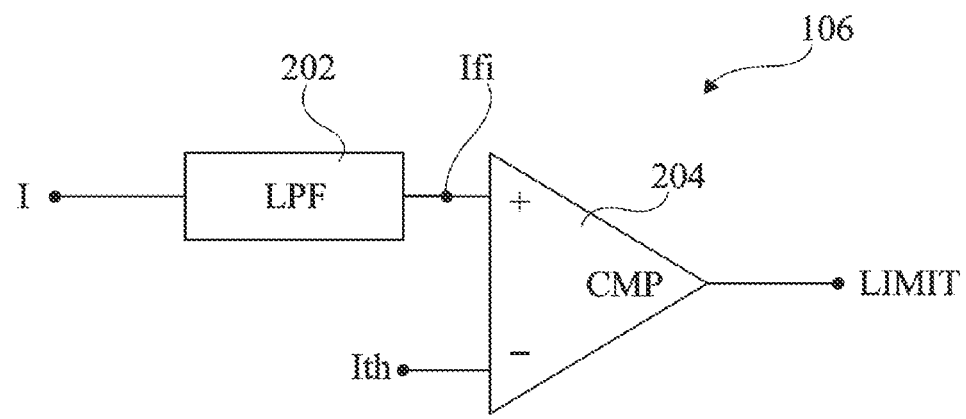
FIG. 2 schematically illustrates an over-current detector of the DC-DC converter of FIG. 1 according to an example embodiment.

FIG. 2 schematically illustrates the over-current detector 106 of FIG. 1 in more detail according to one example.

In the example of FIG. 2, the over-current detector 106 comprises an input receiving a current signal I indicating the current level at the input or output of the converter 102. This current signal I is filtered by a low pass filter (LPF) 202 to generate a filtered signal Ifi, which is in turn provided to the positive input of a comparator (CMP) 204. The negative input of the comparator 204 receives a current threshold Ith. When this current threshold Ith is exceeded by the filtered signal Ifi, the comparator 204 asserts an output signal LIMIT.

The current Iin at the input or Iout at the output of the converter 102 varies during charge and discharge phases of each cycle of the DC-DC converter, depending on the conversion mode, such as whether in buck, boost or buck-boost mode. However, the aim of the over-current detector 106 is not to avoid these high frequency fluctuations, but to limit the average current. Therefore, the low pass filter 202 permits such an average current level to be extracted. However, such an arrangement can lead to undesirable oscillation of the output voltage Vout of the converter 102, as will now be described in more detail with reference to FIG. 3.

Figure 3:
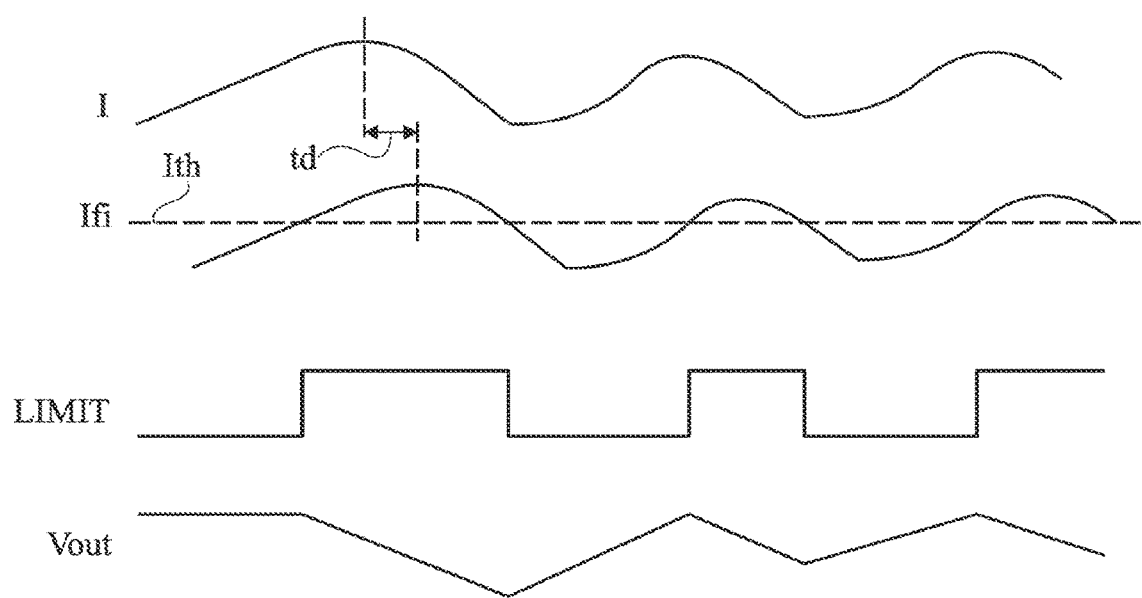
FIG. 3 is a timing diagram illustrating an example of signals in the circuit of FIG. 2.

FIG. 3 is a timing diagram illustrating an example of the signals I, Ifi and LIMIT in the over-current detector 106 of FIG. 2, and the voltage Vout of the converter 102 of FIG. 1. It is assumed that the current I is initially rising.

When the filtered current signal Ifi exceeds the current threshold Ith, the signal LIMIT goes high. In order to reduce the input or output current Iin, Iout of the converter 102, the output voltage Vout is reduced in a linear manner. The current I therefore starts to fall. However, because of the low pass filter 202, the signal Ifi only starts to fall after a delay td introduced by this filter 202. Once the signal Ifi returns below the threshold Ith, the signal LIMIT falls low, and the voltage Vout is increased again, but due to the delay td, the voltage Vout falls lower than necessary.

Similarly, when the filtered current signal Ifi next exceeds the current threshold Ith, a similar situation occurs in which the output voltage Vout rises higher than necessary in view of the delay td of the low pass filter.

These oscillations of the output voltage Vout continue and are undesirable.

One solution to the problem highlighted in FIG. 3 would be to introduce a slow variation of the output voltage Vout, and in particular a response time that is slower than the delay td of the low pass filter. However, such a slow response time is unacceptable in some applications as it can risk the current exceeding desired limits before the appropriate correction is applied.

Another solution to the problem highlighted in FIG. 3 would be to introduce a PID (proportional, integral, differential) control to the output voltage, but such a solution would be complex, most likely including an analog to digital converter, and would require precise tuning of the PID parameter.

Figure 4:
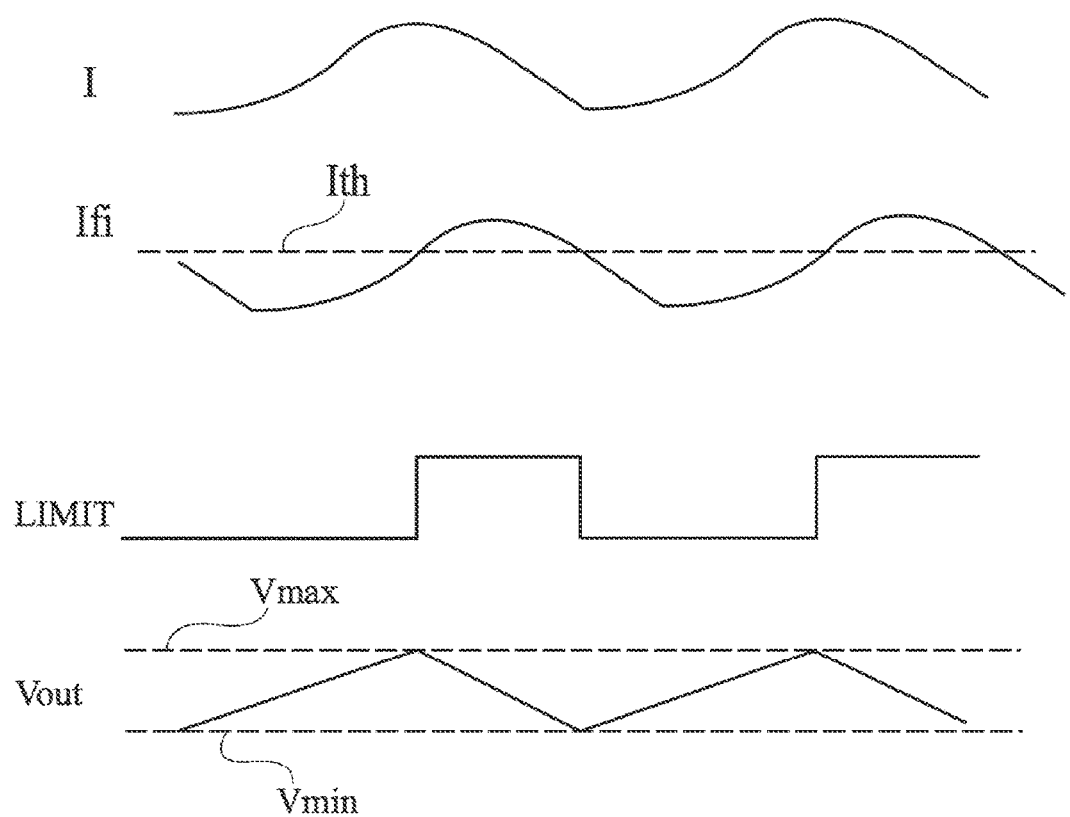
FIG. 4 is a timing diagram illustrating a further example of signals in the circuit of FIG. 2.

FIG. 4 is a timing diagram illustrating a further example of signals in the circuit of FIG. 2. FIG. 4 shows the same signals as those shown in FIG. 3. Furthermore, FIG. 4 represents voltage limits Vmax and Vmin associated with the peaks and troughs of the output voltage Vout during the undesired oscillation. Indeed, the present inventor has noted that generally, in view of the fixed time delay td of the low pass filter, the output voltage Vout will reach a maximum voltage level Vmax when the signal LIMIT at the output of the comparator toggles high, and will reach a minimum voltage level Vmin when the signal LIMIT toggles low, these levels being respectively above and below an optimum intermediate level of the output voltage Vout. As will now be described with reference to FIG. 5, a current limitation mechanism of the present disclosure is based on the value of Vmax or of a signal representative of the level of Vmax, and/or based on the value of Vmin or of a signal representative of the level of Vmin.

Figure 5:
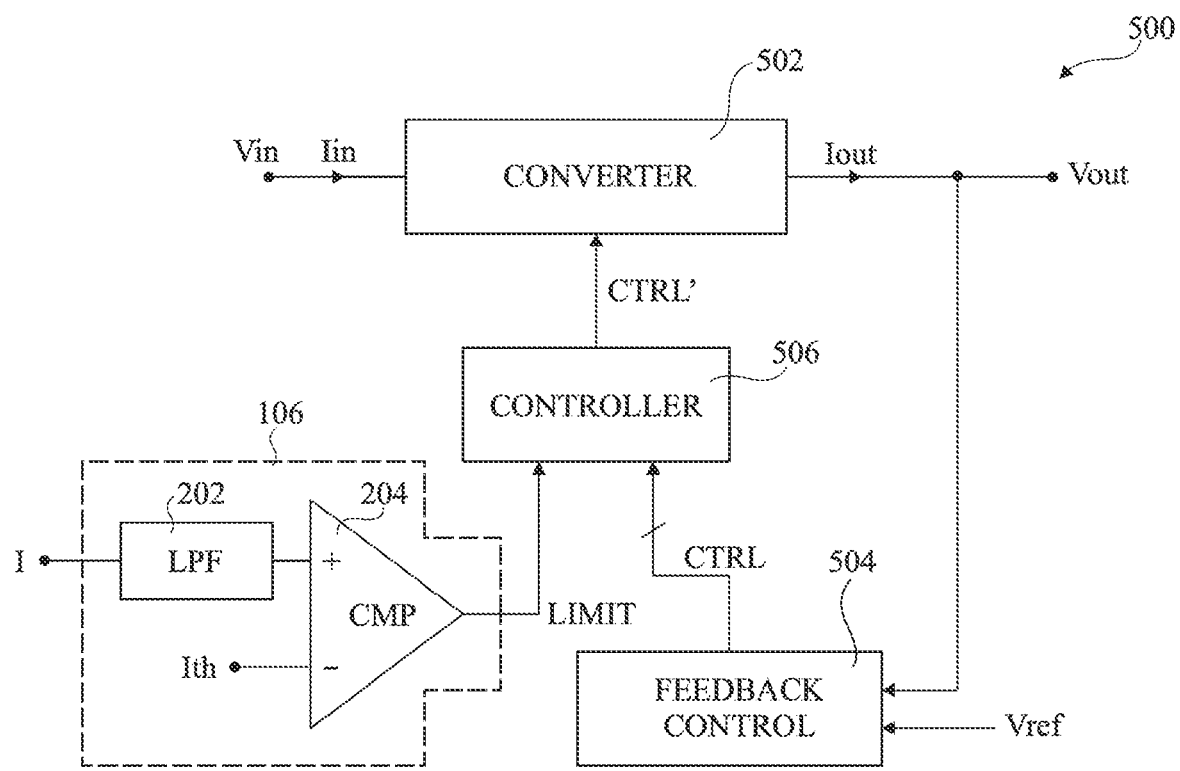
FIG. 5 schematically illustrates a DC-DC converter with a steady state current limitation mechanism according to an example embodiment of the present disclosure.

FIG. 5 schematically illustrates a DC-DC converter 500 with a steady state current limitation mechanism according to an example embodiment of the present disclosure.

The DC-DC converter 500 comprises a converting circuit (CONVERTER) 502, which is for example a buck, boost or buck-boost converter. This circuit 502 receives an input voltage Vin on an input line and generates an output voltage Vout on an output line. The converting circuit 502 receives a control signal CTRL' for controlling the level of the output voltage Vout. For example, this control signal CTRL' is in the form of a digital control signal that controls the duration of a charge and/or discharge phase of the converter 502.

A feedback control circuit (FEEDBACK CONTROL) 504 for example receives the output voltage Vout and a reference voltage Vref and generates a digital control signal CTRL suitable for bringing the output voltage Vout towards a target level indicated by the voltage reference Vref. A controller (CONTROLLER) 506 for example receives the control signal CTRL and generates the control signal CTRL' to the converter 502. The controller 506 also for example receives the signal LIMIT from an over-current detector, which in the example of FIG. 5 is implemented by the circuit 106 of FIG. 2 and will not be described again in detail. The current signal I at the input of the over-current detector 106 for example represents the input current Iin of the converter 502 and/or the output current Iout of the converter 502. For example, the current signal I is a voltage measured across a resistor placed in the input or output path of the converter 502, although other implementations would be possible. In some embodiments, the over-current detector 106 is duplicated, one of the detectors 106 receiving a current signal I representing the current Iin at the input of the converter 502, and the other detector 106 receiving a current signal I representing the current Iout at the output of the converter 502. In such an embodiment the output signals LIMIT from the two detectors 106 can be combined by an OR gate in order to detect an over-current occurring at either or both of the input and output of the converter 502.

Operation of the circuit of FIG. 5 will now be described in more detail with reference to FIG. 6.

Figure 6:
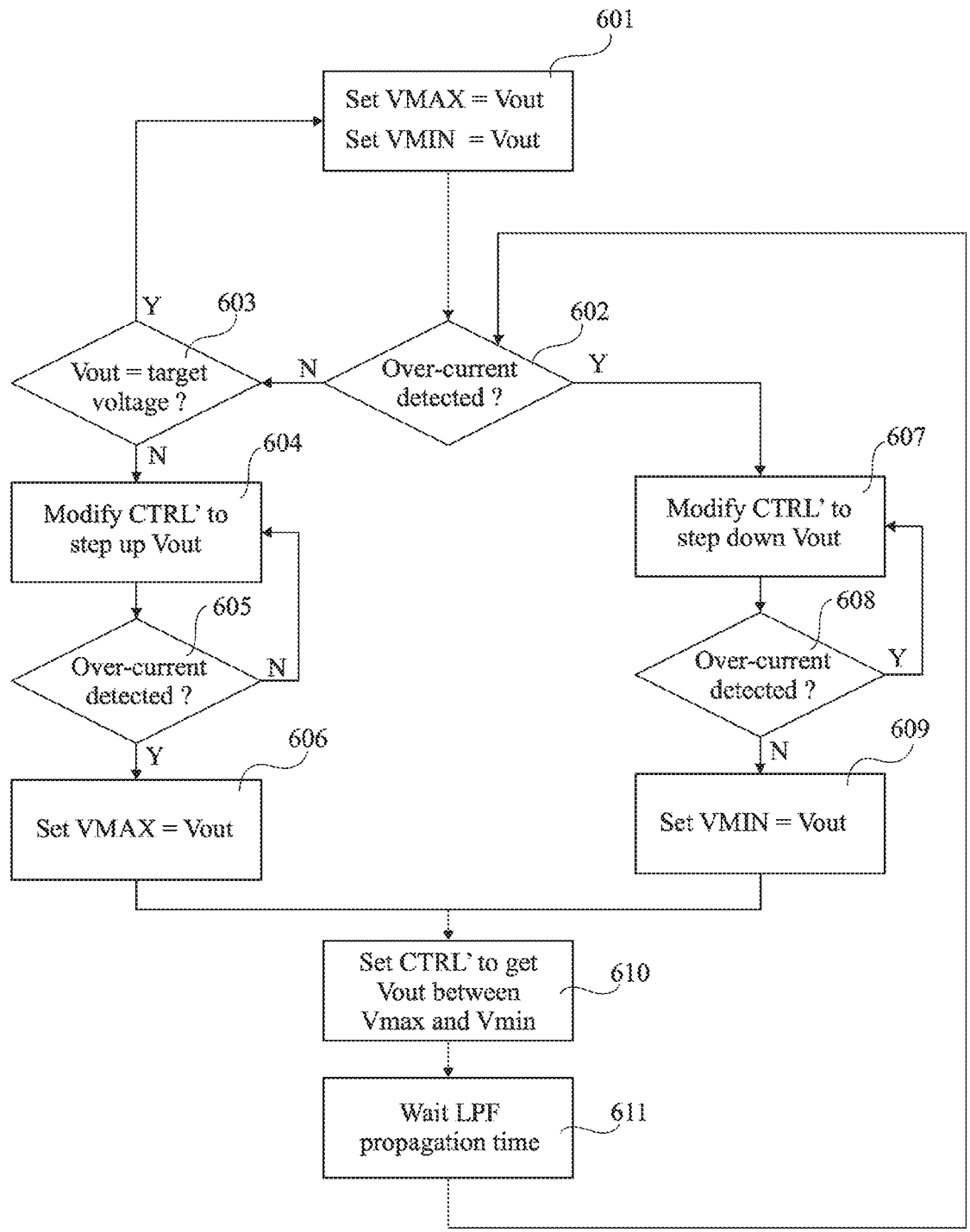
FIG. 6 is a flow diagram illustrating operations in a method of limiting current at the input and/or output of a DC-DC converter according to an example embodiment of the present disclosure.

FIG. 6 is a flow diagram illustrating operations in a method of limiting the current at the input and/or output of a DC-DC converter according to an example embodiment of the present disclosure. The method of FIG. 6 is for example implemented by the controller 506 of FIG. 5, and for example by a state machine implemented within the controller 506.

In an operation 601, parameters VMAX and VMIN are for example set to a value representing the current level of the output voltage Vout, for example by setting these parameters to a current level of the control signal CTRL'.

In an operation 602, it is determined whether an over-current has been detected at the input or output of the DC to DC converter. For example, the over-current detector 106 or a similar circuit is used to generate a signal, such as the signal LIMIT of FIG. 5, indicating when the input and/or output current exceeds the threshold Ith.

If in operation 602 no over-current was detected, the next operation is an operation 603, in which it is determined whether the output voltage Vout of the converter is equal to the target voltage Vref, for example based on whether the control signal CTRL generated by the feedback control circuit 504 is equal to the current level of the control signal CTRL'. If so, the method for example returns to operation 601. If, however, the output voltage Vout is not equal to the target voltage Vref, in an operation 604, the control signal CTRL' is for example modified by the controller 506 to step up the output voltage Vout of the converter. Then, in an operation 605, it is again determined whether an over-current is detected, and if not, the operations 604 and 605 are repeated. When, in operation 605, the over-current is detected, the next operation is an operation 606, in which the parameter VMAX is set by the controller 506 to a value representing the voltage Vout. For example, the parameter VMAX is set to the current value of the control signal CTRL', as will now be described with reference to FIG. 7.

Figure 7:
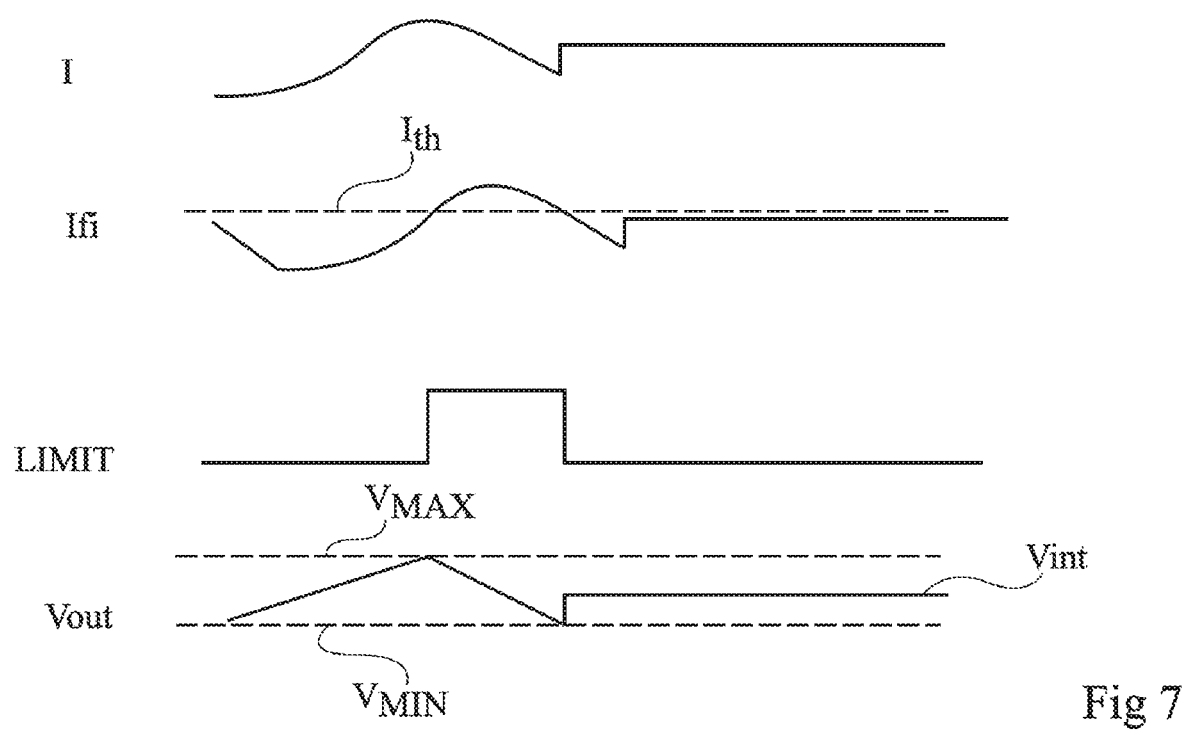
FIG. 7 is a timing diagram illustrating an example of signals in the circuit of FIG. 5.

FIG. 7 is a timing diagram illustrating an example of signals I, Ifi, LIMIT and Vout in the circuit of FIG. 5. When the signal LIMIT is asserted following a period in which the output voltage Vout is increasing, the output voltage Vout has reached a level Vmax, and a value representative of this level is stored as the parameter VMAX.

Referring again to FIG. 6, if an over-current is detected in operation 602, the controller 506 for example modifies the control signal CTRL', in an operation 607, in order to step down the output voltage Vout of the converter. Then, in an operation 608, it is again determined whether an over-current is detected, and if so, the operations 607 and 608 are repeated. When, in operation 608, the over-current is no longer detected, the parameter VMIN is set by the controller 506, in an operation 609, to a value representing the voltage Vout. For example, the parameter VMIN is set to the current value of the control signal CTRL', as will now be described with reference again to FIG. 7.

As shown in FIG. 7, when the signal LIMIT falls low following a period in which the output voltage Vout is decreasing, the output voltage Vout has reached a level Vmin, and a value representative of this level is stored as the parameter VMIN.

After operations 606 and 609, in an operation 610, the control signal CTRL' is set to a value so that Vout will be between the minimum and maximum voltages Vmin and Vmax. In some embodiments, the control signal CTRL' is set to a midpoint between the values of the parameters VMAX and VMIN.

For example, with reference to FIG. 7, when the current Ifi falls below the threshold Ith and the signal LIMIT falls low, the output voltage is at the level Vmin, and the control signal CTRL' is modified in order to bring the voltage Vout to an intermediate value Vint equal to (Vmax+Vmin)/2, or to another intermediate voltage between Vmin and Vmax. For example, this is achieved by applying a new control signal CTRL' equal to an intermediate value between the values of the parameters VMIN and VMAX.

With reference again to FIG. 6, after operation 610, an operation 611 is for example performed in which the method waits for a time delay equal, for example, to at least the propagation delay of the low pass filter 202 of the over-current detector 106, and then the method returns to operation 602.

In some embodiments, an iterative process can be applied by the controller 506 to determine a higher level of the output voltage Vout that can be obtained without causing an over-current, as will now be described with reference to FIG. 8.

Figure 8:
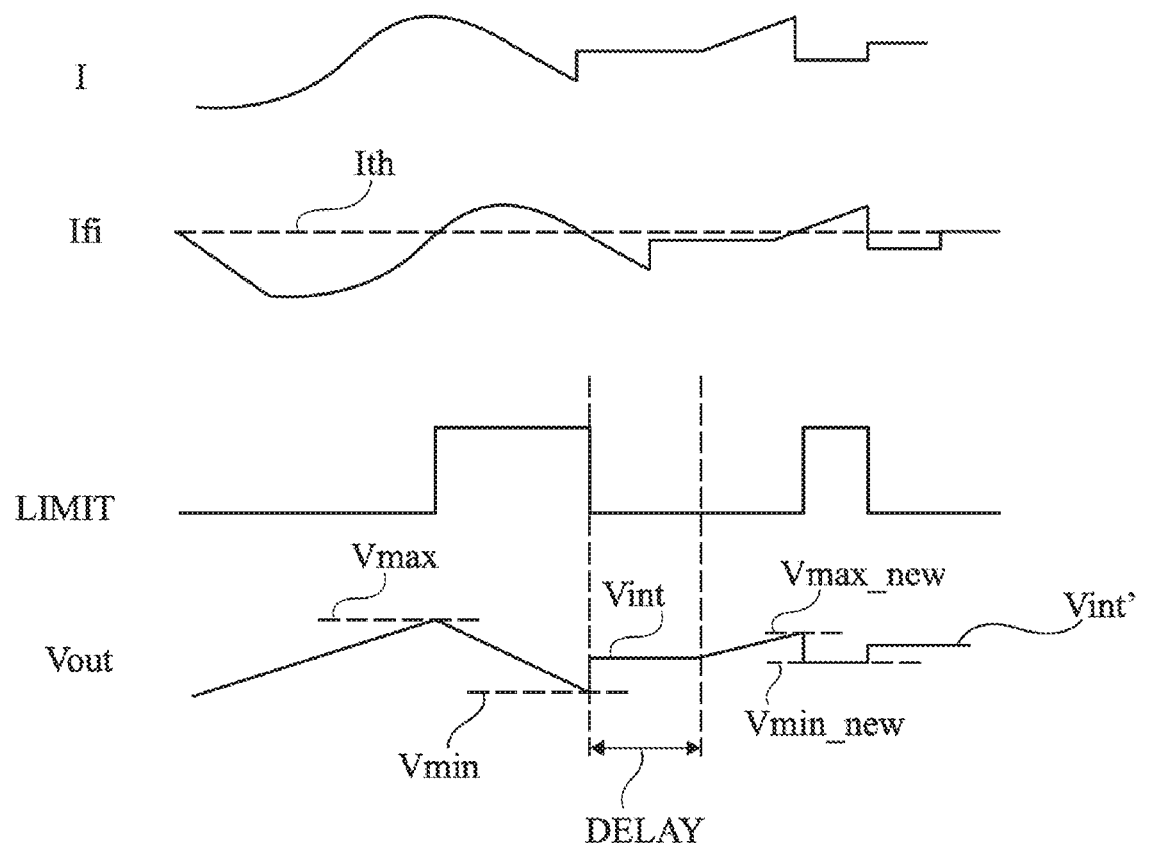
FIG. 8 is a timing diagram illustrating a further example of signals in the circuit of FIG. 5.

FIG. 8 is a timing diagram illustrating a further example of the same signals as those of FIG. 7. However, in the example of FIG. 8, the intermediate voltage Vint is maintained for a fixed time duration DELAY, which is for example longer than the time delay td introduced by the low pass filter. The control signal CTRL' is then for example modified in order to increase again the output voltage Vout, which again causes the current threshold Ith to be exceeded. However, in view of the time delay DELAY, the new maximum voltage level reached by the output voltage Vout is a level Vmax_new, which is lower than Vmax. The control signal CTRL' is then for example modified to a level to bring the output voltage to a level Vmin_new corresponding to a mid-point between the voltages Vmin and Vmax_new. Then, when signal LIMIT toggles again to a low level, the control signal CTRL' is for example modified to bring the output voltage Vout to a new intermediate level Vint', corresponding for example to a mid-point between the levels Vmax_new and Vmin_new.

An advantage of the embodiments described herein is that a steady state current limiting mechanism is implemented with relatively low complexity, and for example without the use of any analog to digital conversion.

Various embodiments and variants have been described. Those skilled in the art will understand that certain features of these embodiments can be combined and other variants will readily occur to those skilled in the art. In particular, it will be apparent to those skilled in the art that the embodiments described herein could be applied to any type of DC to DC converter, including buck, boost and buck-boost converters.

What is claimed is:

1. A method for limiting an input or output current of a DC to DC converter, the method comprising:
  storing a first value representative of a level of an output voltage of the DC to DC converter in response to the input or output current exceeding or falling below a first threshold;

storing a second value representative of the level of the output voltage in response to the input or output current falling below the first threshold or a further threshold; and modifying a control signal based on the first and second values, wherein modifying the control signal based on the first and second values comprises modifying the control signal to bring the output voltage to an intermediate voltage level between the level of the output voltage represented by the first value and the level of the output voltage represented by the second value.

2. The method of claim 1, wherein the first value is equal to a value of the control signal when the input or output current exceeded or fell below the first threshold.

3. The method of claim 1, wherein the intermediate voltage level is a midpoint between the level represented by the first value and the level represented by the second value.

4. The method of claim 1, wherein the first value is equal to a value of the control signal when the input or output current exceeded the first threshold, wherein the second value is equal to the value of the control signal when the input or output current fell below the first threshold or the further threshold, and wherein the control signal is modified to a value between the first and second values.

5. The method of claim 1, wherein modifying the control signal comprises maintaining the control signal for a fixed time delay.

6. The method of claim 5, further comprising, after maintaining the control signal for the fixed time delay, applying the control signal to the DC to DC converter to increase or decrease the output voltage until the output voltage again exceeds or falls below the first threshold or the further threshold.

7. The method of claim 6, further comprising:
storing a third value representative of the level of the output voltage of the DC to DC converter in response to the input or output current again exceeding or falling below the first threshold or the further threshold; and
applying the control signal to the DC to DC converter to reduce the output voltage to a further intermediate voltage level between a level represented by a second value and a further level.

8. The method of claim 7, further comprising modifying the control signal based on the third value in response to the input or output current yet again exceeding or falling below the first threshold or the further threshold.

9. The method of claim 8, wherein modifying the control signal based on the third value comprises modifying the control signal to bring the output voltage to a new intermediate voltage level between the level represented by the third value and the further intermediate level.

10. A method of limiting an input or output current of a DC to DC converter controlled by a control signal, the method comprising:
in response to the input or output current exceeding or falling below a first threshold, storing a first value equal to the value of the control signal at a time when the input or output current exceeded or fell below the first threshold, the first value being representative of a level of an output voltage of the DC to DC converter;
in response to the input or output current falling below the first threshold or a further threshold, storing a second value representative of the level of the output voltage; and
modifying the control signal to bring the output voltage to an intermediate voltage level between the level of the output voltage represented by the first value and the level of the output voltage represented by the second value.

11. The method of claim 10, wherein the first value is equal to the value of the control signal when the input or output current exceeded or fell below the first threshold.

12. The method of claim 10, wherein the first value is equal to the value of the control signal at the time when the input or output current exceeded the first threshold, the second value is equal to the value of the control signal at the time when the input or output current fell below the first threshold or the further threshold, and the control signal is modified to a value between the first and second values.

13. The method of claim 10, wherein the modified control signal is maintained for a fixed time delay.

14. The method of claim 13, further comprising, after maintaining the control signal for the fixed time delay, applying the modified control signal to the DC to DC converter to increase or decrease the output voltage until the output voltage again exceeds or falls below the first threshold or the further threshold.

15. The method of claim 14, further comprising, in response to the input or output current again exceeding or falling below the first threshold or the further threshold, storing a third value representative of the level of the output voltage of the DC to DC converter and reducing the output voltage of the DC to DC converter to a further intermediate voltage level between the level represented by the second value and the further level.

16. The method of claim 10, wherein the intermediate voltage level is a midpoint between the level represented by the first value and the level represented by the second value.

17. A method for limiting an input or output current of a DC to DC converter, the method comprising:
storing a first value representative of a level of an output voltage of the DC to DC converter in response to the input or output current exceeding or falling below a first threshold;
modifying a control signal based on the first value, wherein modifying the control signal comprises maintaining the control signal for a fixed time delay;
after maintaining the control signals for the fixed time delay, applying the control signal to the DC to DC converter to increase or decrease the output voltage until the output voltage again exceeds or falls below the first threshold or a further threshold;
storing a third value representative of the level of the output voltage of the DC to DC converter in response to the input or output current again exceeding or falling below the first threshold or the further threshold; and
applying the control signal to the DC to DC converter to reduce the output voltage to a further intermediate voltage level between a level represented by a second value and a further level.

18. The method of claim 17, further comprising modifying the control signal based on the third value in response to the input or output current yet again exceeding or falling below the first threshold or the further threshold.

19. The method of claim 18, wherein modifying the control signal based on the third value comprises modifying the control signal to bring the output voltage to a new intermediate voltage level between the level represented by the third value and the further intermediate level.

20. The method of claim 17, wherein the first value is equal to a value of the control signal when the input or output current exceeded or fell below the first threshold.

21. The method of claim 17, wherein an intermediate voltage level is a midpoint between the level represented by the first value and the level represented by the second value.

22. The method of claim 17, wherein the first value is equal to the value of the control signal when the input or output current exceeded the first threshold, wherein the second value is equal to the value of the control signal when the input or output current fell below the first threshold or the further threshold, and wherein the control signal is modified to a value between the first and second values.

\* \* \* \* \*